(12) United States Patent
Thornton

(10) Patent No.: US 10,039,175 B1
(45) Date of Patent: Jul. 31, 2018

(54) DELAY MODULE FOR LED LIGHTING FIXTURES

(71) Applicant: Cree, Inc., Durham, NC (US)

(72) Inventor: Gerry Farrel Thornton, Morrisville, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/830,999

(22) Filed: Dec. 4, 2017

(51) Int. Cl.
| | |
|---|---|
| H05B 37/02 | (2006.01) |
| H05B 33/08 | (2006.01) |
| F21S 8/08 | (2006.01) |
| F21V 29/70 | (2015.01) |
| F21V 3/00 | (2015.01) |
| F21V 7/00 | (2006.01) |
| F21Y 115/10 | (2016.01) |

(52) U.S. Cl.
CPC ..... H05B 37/0281 (2013.01); H05B 33/0809 (2013.01); H05B 33/0827 (2013.01); H05B 33/0845 (2013.01); H05B 33/0863 (2013.01); H05B 37/0263 (2013.01); H05B 37/0272 (2013.01); *F21S 8/08* (2013.01); *F21V 3/00* (2013.01); *F21V 7/00* (2013.01); *F21V 29/70* (2015.01); *F21Y 2115/10* (2016.08)

(58) Field of Classification Search
CPC ............ H05B 33/0815; H05B 33/0818; H05B 33/0803; H05B 33/0842; H05B 33/0845; H05B 33/0848; H05B 37/02; H05B 37/029; H05B 37/0263; Y02B 20/46
See application file for complete search history.

(56) References Cited

U.S. PATENT DOCUMENTS

| | | | |
|---|---|---|---|
| 8,310,171 B2 * | 11/2012 | Reisenauer ........ | H05B 33/0848 315/176 |
| 8,901,834 B2 * | 12/2014 | Frias, Sr. ............... | H05B 37/02 315/192 |
| 9,699,836 B2 * | 7/2017 | Bahrehmand ...... | H05B 33/0815 |
| 9,706,617 B2 * | 7/2017 | Carrigan ............ | H05B 33/0842 |

* cited by examiner

*Primary Examiner* — Haissa Philogene
(74) *Attorney, Agent, or Firm* — Withrow & Terranova, P.L.L.C.

(57) ABSTRACT

A delay module is used with one or more lighting fixtures that receive an AC signal from an electrical circuit. The delay module includes an input node, which is coupled to the electrical circuit, and an output node, which is coupled to a driver module of one or more lighting fixtures. When an AC signal is initially presented to the electrical circuit, such as when a wall controller is switched to an on state, the delay module will provide, or maintain, an open circuit between the input node and the output node for a predetermined delay period. When the delay period expires, the delay module will provide a closed circuit between the input node and the output node, wherein the AC signal is passed from the electrical circuit to the driver module of the associated lighting fixture(s).

44 Claims, 19 Drawing Sheets

DELAY MODULE FOR LED LIGHTING FIXTURES

FIELD OF THE DISCLOSURE

The present disclosure relates to lighting fixtures, and in particular to using a sequenced startup for LED lighting fixtures in a lighting group.

BACKGROUND

In recent years, a movement has gained traction to replace incandescent light bulbs with lighting fixtures that employ more efficient lighting technologies, as well as to replace relatively efficient fluorescent and high intensity discharge (HID) lighting fixtures with lighting technologies that produce a more pleasing, natural light. One such technology that shows tremendous promise employs light emitting diodes (LEDs) as the light source. Compared with incandescent bulbs, LED-based light fixtures are much more efficient at converting electrical energy into light, are longer lasting, and are also capable of producing light that is very natural. Compared with fluorescent and/or HID lighting, LED-based fixtures are still significantly more efficient and capable of producing light that is much more natural and more capable of accurately rendering colors. As a result, lighting fixtures that employ LED technologies are replacing incandescent, fluorescent, and HID bulbs in residential, commercial, and industrial applications.

The improved efficiency associated with LED-based fixtures is a direct result of the low amount of power that an LED-based fixtures draws in steady-state operation to output a desired amount of light for general illumination. Theoretically, a typical electrical circuit should be able to handle more LED-based fixtures than incandescent, fluorescent, or HID fixtures, given the improved steady-state efficiency of the LED-based fixtures. In practice, however, the nature of the LED-based fixtures has unexpectedly been found to unduly limit the number of LED-based fixtures that one can put on a given electrical circuit.

LED-based fixtures employ power supplies and control circuitry, which are collectively referred to as drivers, to convert an AC supply voltage to a DC supply voltage that is used to power the LEDs and the other electronics of the LED-based fixtures. The power supplies typically include relatively large electrolytic capacitors in their rectification and filter sections. When power is initially supplied to the LED-based fixtures, such as when an individual flips a light switch to turn on the LED-based fixtures, significant inrush currents are initially required to charge the large electrolytic capacitors of the power supplies for all of the LED-based fixtures of the electrical circuit, in addition to the current necessary to drive the LEDs of the LED light source. Once these large electrolytic capacitors are charged, the current draw of the LED-based fixtures is significantly reduced to a steady-state level where the primary current draw is that used to drive the LEDs of the LED light source. In practice, the inrush current levels for the LED-based fixtures are many times greater than the steady-state current levels.

Unfortunately, the inrush currents increase the power ratings for the LED-based fixtures, and as a result, directly limit the number of LED-based fixtures that can be added to a given electrical circuit. While an electrical circuit, as well as the circuit breaker or fuse that protects the electrical circuit, can handle a relatively large number of LED-based fixtures based on the steady-state currents, the elevated inrush currents associated with simultaneously turning the LED-based fixtures on can dramatically limit the number of LED-based fixtures that can be added to the electrical circuit. In many instances, even with a limited number of LED-based fixtures on a given electrical circuit, the elevated inrush currents from simultaneously turning on multiple LED-based fixtures may result in tripped circuit breakers and blown fuses, which are potentially confusing and annoying to property owners and managers.

Limiting the number of LED-based fixtures that can be added to an electrical circuit increases the number of electrical circuits for a given installation, and as such, significantly increases the costs associated with installing LED-based fixtures or prevents the use of LED-based fixtures altogether. Tripping circuit breakers or blowing fuses during normal operation is unacceptable to property owners and managers. Accordingly, there is a need to overcome the limitations imposed on the number of LED-based fixtures that can be added to a typical electrical circuit due to the elevated inrush currents associated with turning on the LED-based fixtures.

SUMMARY

The present disclosure relates to a delay module for use with one or more lighting fixtures that receive an AC (power) signal from an electrical circuit. The delay module includes an input node, which is coupled to the electrical circuit, and an output node, which is coupled to a driver module of one or more lighting fixtures. In operation, the delay module will provide an open circuit between the input node and the output node prior to an AC signal being presented on the electrical circuit. When an AC signal is initially presented to the electrical circuit, such as when a wall controller is switched to an on state, the delay module will provide an open circuit between the input node and the output node for a predetermined delay period. During the delay period, the delay module prevents the AC signal that is on the electrical circuit from passing to the driver module of the associated lighting fixture(s).

When the delay period expires, the delay module will provide a closed circuit between the input node and the output node, wherein the AC signal is passed from the electrical circuit to the driver module of the associated lighting fixture(s). In certain embodiments, when the AC signal is no longer provided to the input node, such as when the wall controller is returned to an off state, the delay module will again provide an open circuit between the input node and the output node. By delaying passage of the AC signal to the various lighting fixtures using different delay periods, the inrush currents for the various lighting fixtures are distributed in time, thereby avoiding subjecting the electrical circuit to the inrush currents for all of the lighting fixtures at the same time.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
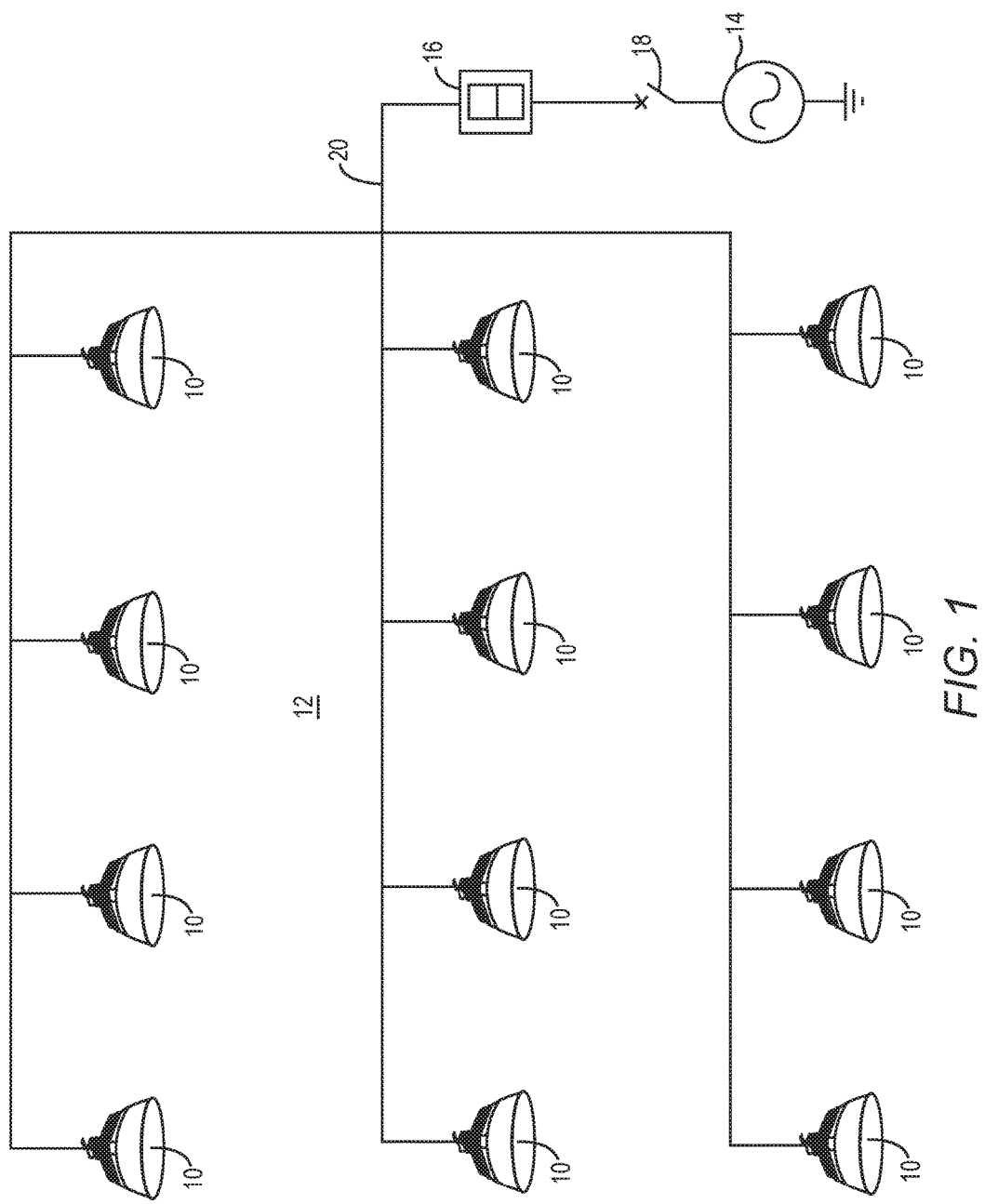
FIG. 1 illustrates a lighting network with multiple lighting fixtures, a wall controller, and circuit breaker.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present disclosure relates to a delay module for use with one or more lighting fixtures that receive an AC (power) signal from an electrical circuit. The delay module includes an input node, which is coupled to the electrical circuit, and an output node, which is coupled to a driver module of one or more lighting fixtures. In operation, the delay module will provide an open circuit between the input node and the output node prior to an AC signal being presented on the electrical circuit. When an AC signal is initially presented to the electrical circuit, such as when a wall controller is switched to an on state, the delay module will provide an open circuit between the input node and the output node for a predetermined delay period. During the delay period, the delay module prevents the AC signal that is on the electrical circuit 20 from passing to the driver module of the associated lighting fixture(s).

When the delay period expires, the delay module will provide a closed circuit between the input node and the output node, wherein the AC signal is passed from the electrical circuit to the driver module of the associated lighting fixture(s). In certain embodiments, when the AC signal is no longer provided to the input node, such as when the wall controller is returned to an off state, the delay module will again provide an open circuit between the input node and the output node. By delaying passage of the AC signal to the various lighting fixtures using different delay periods, the inrush currents for the various lighting fixtures are distributed in time, thereby avoiding subjecting the electrical circuit to the inrush currents for all of the lighting fixtures at the same time. The following describes the delay module and its operation in association with one or more lighting fixtures in detail.

With reference to FIG. 1, multiple lighting fixtures 10 reside in a lighting group 12. The lighting fixtures 10 of the lighting group 12 are LED-based and receive power from an AC source 14 via a wall controller 16 and a circuit breaker 18. The AC source 14 may be a traditional 120 volt (V), 240 V, or like power source, wherein the circuit breaker 18 is a normally closed switch, which opens when current flowing through the circuit breaker 18 exceeds a defined voltage threshold instantaneously or for a given amount of time. The wall controller 16 is effectively a switch that controls the supply of power to the lighting fixtures 10 of the lighting group 12. As those skilled in art will appreciate, the lighting group 12, wall controller 16, and circuit breaker 18 of FIG. 1 represent one electrical circuit 20 of many similar circuits provided in a residential, commercial, or industrial setting and receiving power from the AC source 14.

As noted above, the LED-based lighting fixtures 10 are generally the most efficient light sources available during steady-state operation; however, the elevated inrush currents associated with charging the capacitance of the power supplies when turning on the lighting fixtures 10 often significantly limits the number of lighting fixtures 10 that can be served by a given electrical circuit 20. While FIG. 1 illustrates twelve lighting fixtures 10, the electrical circuit 20 may include any number of lighting fixtures 10.

Figure 2:
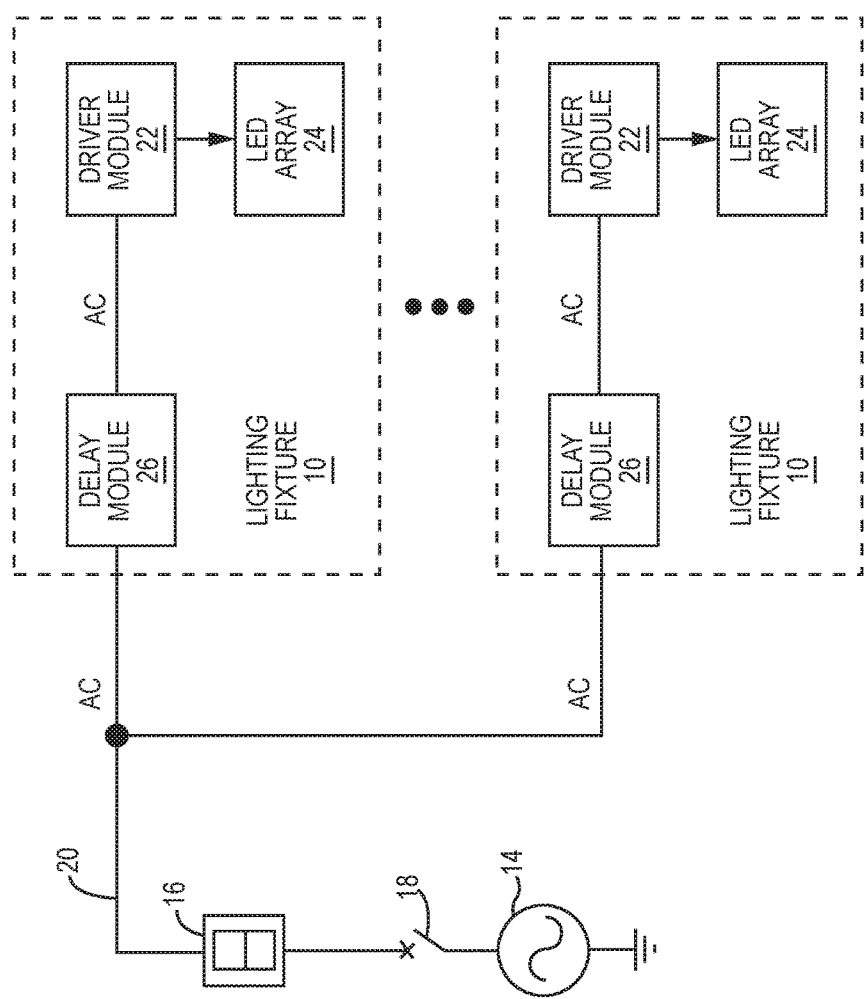
FIG. 2 illustrates a lighting network wherein the lighting fixtures include an integrated delay module, according to one embodiment of the disclosure.

As illustrated in FIG. 2, each lighting fixture 10 includes a driver module 22 and an LED array 24. As detailed further below, the driver module 22 includes a power supply and driver electronics, which drive the numerous LEDs that form the LED array 24. The power supply converts incoming AC signals to one or more DC signals, which are required by the driver electronics. The driver electronics will drive the LEDs of the LED array 24 with pulse width modulated (PWM) or DC currents, depending on the application, to provide light for general illumination.

To resolve the inrush issue, the present disclosure proposes techniques for sequentially energizing the lighting fixtures 10 that are on a given electrical circuit 20. In particular, each lighting fixture 10 includes or is closely associated with delay circuitry, which is referred to herein as a delay module 26. For the embodiment illustrated in FIG. 2, each lighting fixture 10 includes an integrated delay module 26. When the wall controller 16 is switched such that the AC signal is presented to the electrical circuit 20, the delay module 26 functions to delay initial presentation of the AC signal to the driver module 22 for a given delay period. The delay period generally starts when the AC signal is presented to the delay module 26 upon closing the internal switch circuitry of the wall controller 16. During the delay period, the delay module 26 will block passage of the AC signal to the driver module 22 of the lighting fixture 10. When the delay period ends, the delay module 26 will pass the AC signal to the driver module 22 of the lighting fixture 10 until the wall controller 16 is opened.

Figure 3:
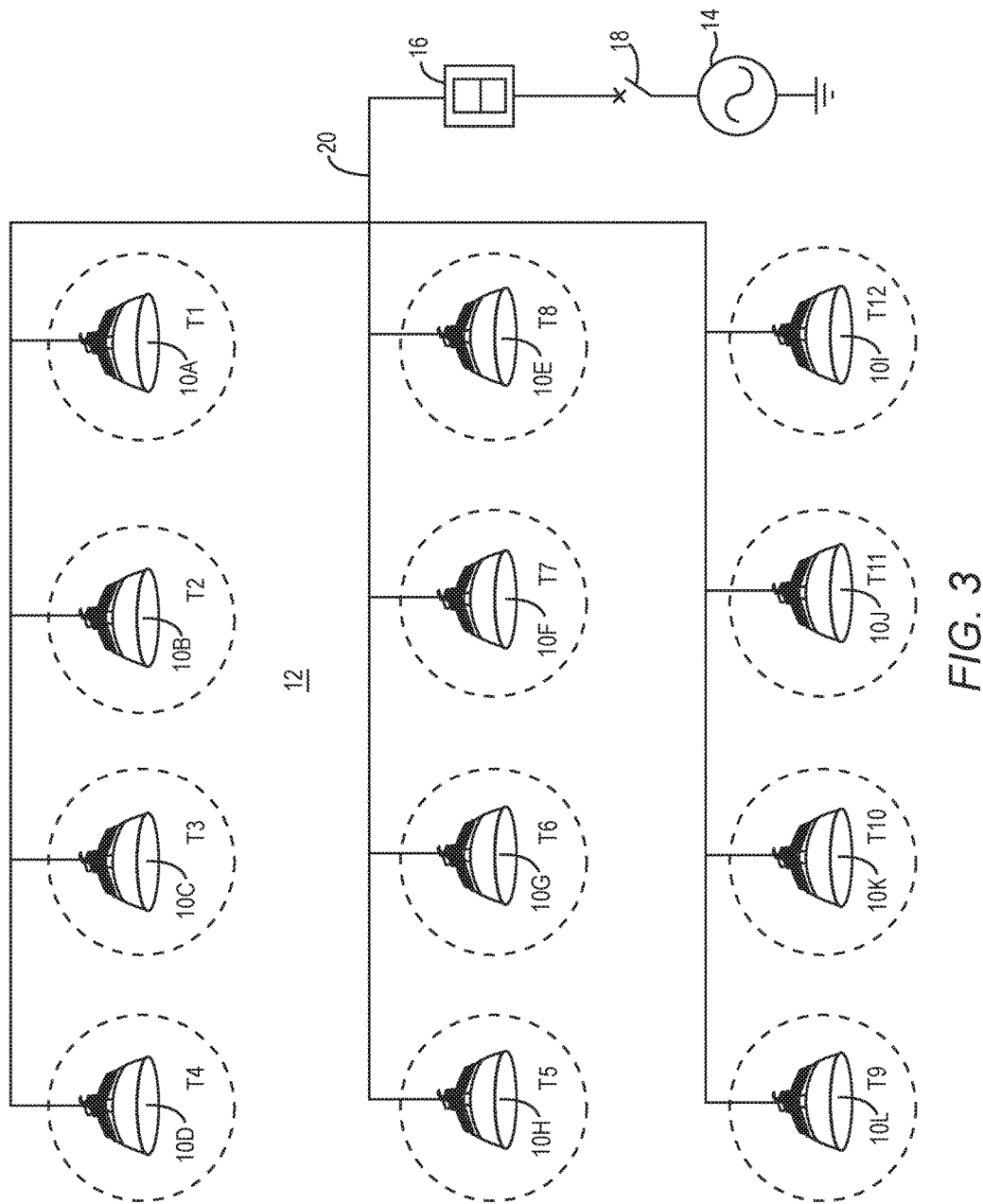
FIG. 3 illustrates each lighting fixture in the lighting network of FIG. 1 having a different delay periods.
Figure 4:
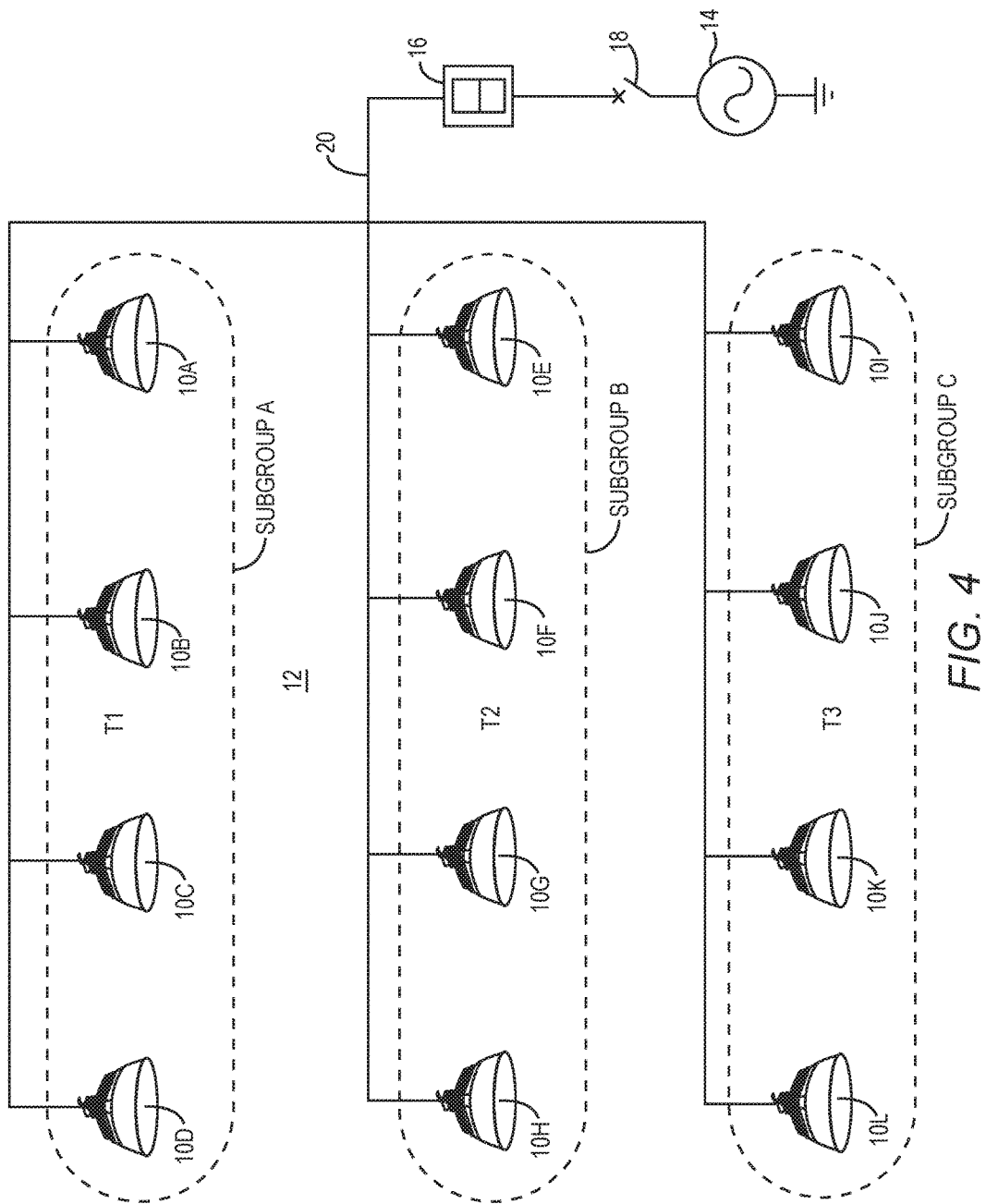
FIG. 4 illustrates different groups of the lighting fixtures in the lighting network of FIG. 1 having different delay periods, according to a first embodiment.
Figure 5:
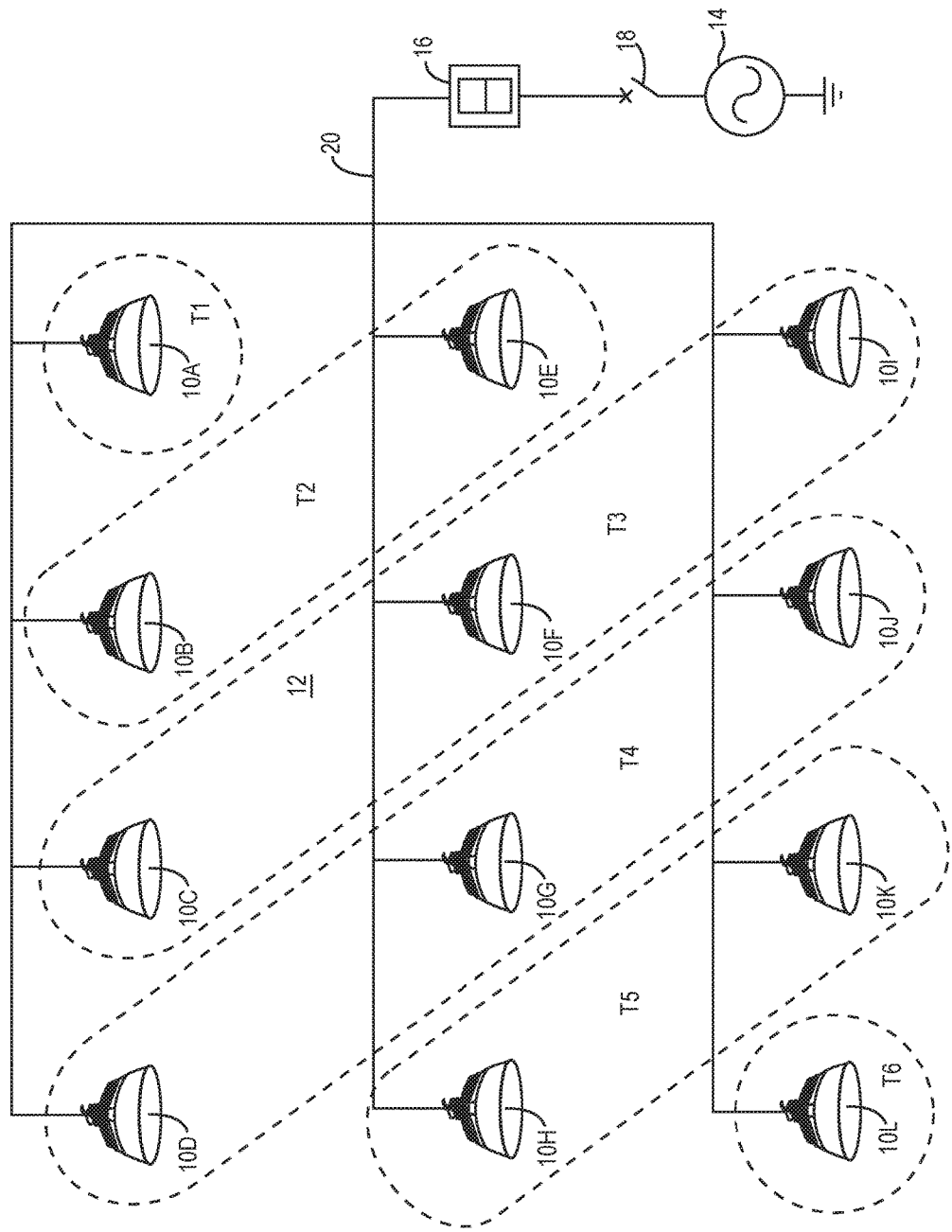
FIG. 5 illustrates different groups of lighting fixtures in the lighting network of FIG. 1 having different delay periods, according to a second embodiment.

By programming delay periods of different delay lengths for the different delay modules 26, the AC signal provided by the AC source 14 may be sequentially presented to the driver modules 22 of the different lighting fixtures 10 of a single electrical circuit 20 based on the respective delay periods. FIGS. 3, 4, and 5 illustrate this concept. As shown in FIG. 3, the electrical circuit 20 includes twelve lighting fixtures 10. Each of the twelve lighting fixtures 10A-10L includes or is associated with a delay module 26, and each delay module 26 is programmed with a delay period of a different length. Once the wall controller 16 is closed, the driver modules 22 of each of the lighting fixtures 10A-10L will be sequentially energized, wherein the driver module 22 of lighting fixture 10A initially receives the AC signal at time T1, the driver module 22 of lighting fixture 10B initially receives the AC signal at time T2, the driver module 22 of lighting fixture 10C initially receives the AC signal at time T3, and so on and so forth until the driver modules of each of the lighting fixtures 10A-10L receive the AC signal. Notably, the delay module 26 associated with lighting fixture 10A may have a delay period set to zero, wherein the AC signal is initially presented to the driver module 22 of lighting fixture 10A as soon the wall controller 16 closes. For the above embodiment, each driver module 22 for the lighting fixtures 10A-10L is sequentially presented with the AC signal, wherein only one driver module 22 is initially presented the AC signal at any given time.

For the embodiment of FIG. 4, the delay modules 26 of the lighting fixtures 10A-10L are programmed such that groups of driver modules 22 for the lighting fixtures 10A-10L are sequentially presented with the AC signal, wherein a subgroup of driver modules 22 are initially presented with the AC signal at any given time. Assume that the twelve lighting fixtures 10A-10L are divided into three subgroups: subgroup A (lighting fixtures 10A-10D); subgroup B (lighting fixtures 10E-10H); and subgroup C (lighting fixtures 10I-10L). The delay periods for the delay modules 26 within each of subgroup are the same, but the delay periods for the different subgroups are different. Once the wall controller 16 is closed, the various delay modules 26 ensure that the driver modules 22 of the lighting fixtures 10A-10E of subgroup A initially receive the AC signal at time T1, the driver modules 22 of the lighting fixtures 10E-10H of subgroup B initially receive the AC signal at time T2, and the driver modules 22 of the lighting fixture 10I-10L initially receive the AC signal at time T3.

In many instances, controlling when the driver modules 22 are energized directly corresponds to when the driver drives the LED arrays 24, and as such, when light for general illumination is provided by the various lighting fixtures 10A-10L. Accordingly, employing the delay modules 26 may result in sequential emission of light from the lighting fixtures 10A-10L on an individual basis, as illustrated in FIG. 3, or on a subgroup basis, as illustrated in FIG. 4. In such instances, the delay periods for the various lighting fixtures 10A-10L may be set such that the lighting fixtures 10A-10L, on an individual or sub grouped basis, began emitting light in a sequenced pattern within the lighting environment. For example, linearly aligned lighting fixtures 10 in a corridor may light up one after another along the corridor, such that the lighting fixtures 10 begin emitting light in a visible wave along the corridor. Extending this wave concept to a room, the lighting fixtures 10 that are within the room may begin emitting light in a visible wave that runs from one side of the room to another, one corner of the room to another, outward from a given point, such as a point near the wall controller 16, and the like.

With reference again to FIG. 4, assume that the lighting fixtures 10A-10L are oriented in a rectangular room as depicted. When the electrical circuit 20 is energized by the wall controller 16, lighting fixtures 10A-10L will begin emitting light in a visible wave that starts at the top of the room and progresses to the bottom of the room, wherein the row of lighting fixtures 10A-10D are energized and begin emitting light at time T1, the row of lighting fixtures 10E-10H are energized and begin emitting light at time T2, and the row of lighting fixtures 10I-10L are energized and begin emitting light at time T3. FIG. 5 illustrates a configuration wherein the lighting fixtures 10A-10L begin emitting light in a visible way that starts at the top-right corner of the room with lighting fixture 10A and progresses diagonally to the bottom-left corner of the room to lighting fixture 10L. Initially, lighting fixture 10A is energized and begins emitting light at time T1, lighting fixtures 10B and 10E are energized and begin emitting light at time T2, lighting fixtures 10C, 10F, and 10I are energized and begin emitting light at time T3, lighting fixtures 10D, 10G, and 10J are energized and begin emitting light at time T4, lighting fixtures 10H and 10K are energized and begin emitting light at time T5, and lighting fixture 10L is energized and begins emitting light at time T6. Those skilled in the art will recognize that virtually any type of wave pattern may be created in addition to the ones specifically identified herein by setting the delays for the various delay modules that are associated with the lighting fixtures 10. For example, the waves may begin in the middle of the room and progress outward to the edges of the room, or vice versa.

Figure 6:
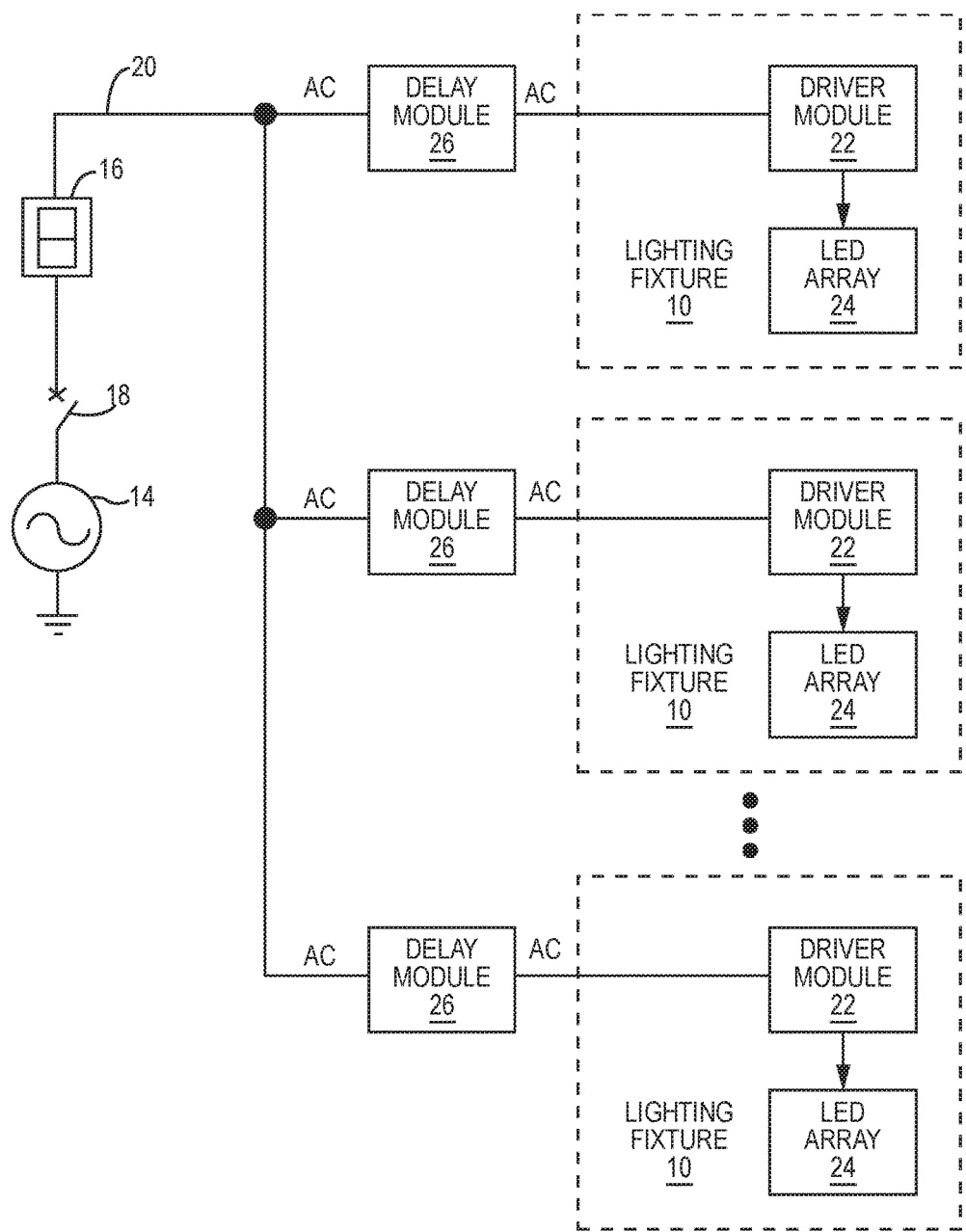
FIG. 6 illustrates a lighting network wherein each of the lighting fixtures is associated with an external delay module, according to one embodiment of the disclosure.

For the embodiment illustrated in FIG. 2, the delay modules 26 are integrated within the lighting fixture 10. However, the delay module 26 may reside in self-contained units that are outside of the lighting fixture 10, as illustrated in FIG. 6. While each lighting fixture 10 is illustrated as being associated with a delay module 26, each lighting fixture 10 need not be associated with its own delay module 26. In particular, one or more lighting fixtures 10 for a given electrical circuit 20 may be immediately energized in response to closing the wall controller 16, while energizing the remaining lighting fixtures 10 of the electrical circuit 20 is delayed as desired via integrated or standalone delay modules 26.

Figure 7A:
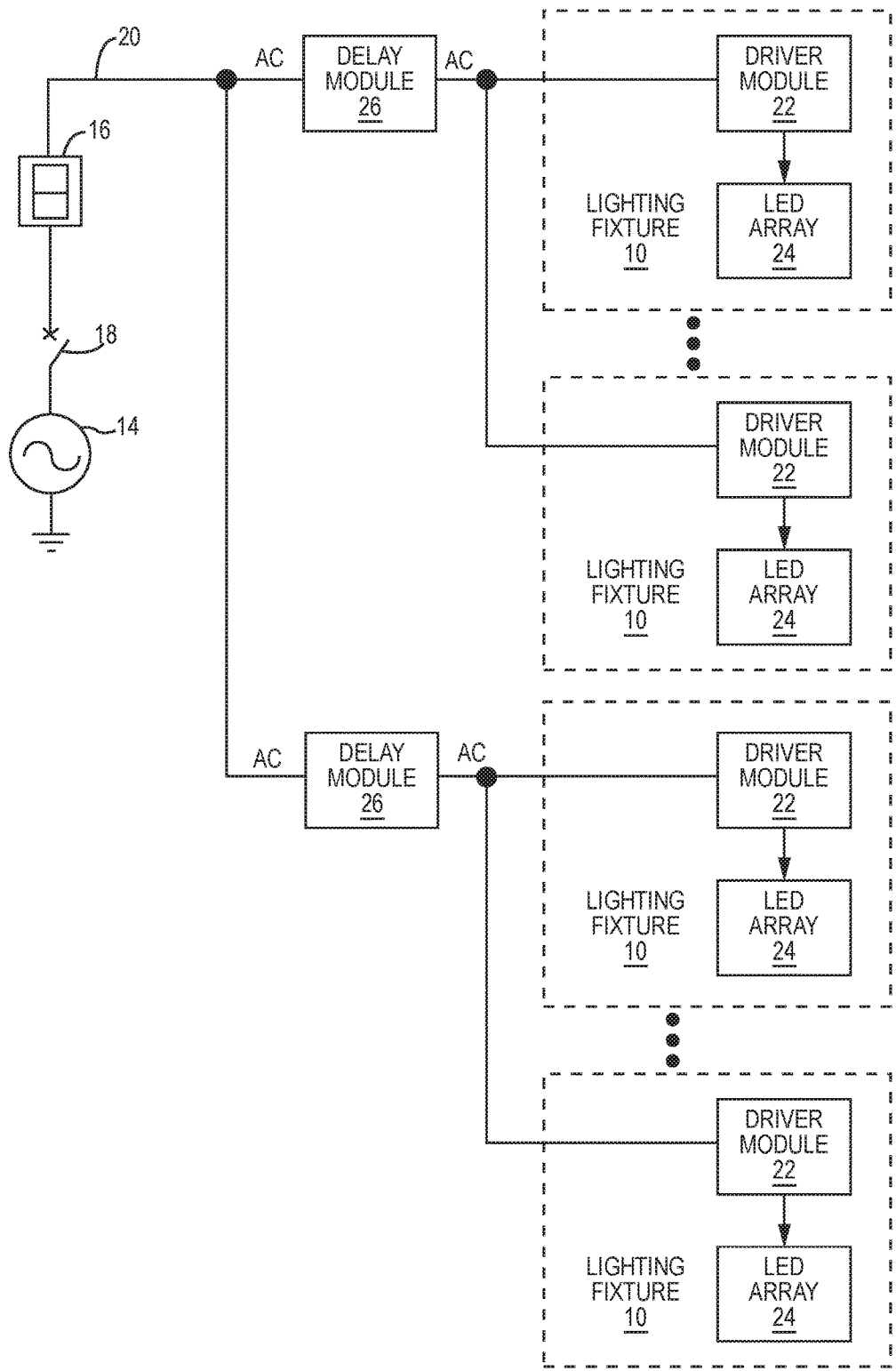
FIG. 7A illustrates a lighting network wherein groups of the lighting fixtures are associated with an external delay module, according to one embodiment of the disclosure.

As illustrated in FIG. 7A, a single delay module 26 may be used to delay presentation of the AC signal to two or more lighting fixtures 10 when the electrical circuit 20 is energized by the wall controller 16. Further, the delay modules 26 may be integrated with the lighting fixtures 10 or configured as standalone units, which are coupled to one or more of the lighting fixtures 10 through appropriate wiring that can handle the AC signal. In an alternative embodiment, a first lighting fixture 10 may have an integrated delay module 26, which is configured to be coupled to a second lighting fixture 10, which does not have an integrated delay module 26. As such, the integrated delay module 26 can delay the AC signal by the delay period for both the first lighting fixture 10 in which the delay module 26 is integrated, as well as the second lighting fixture 10 that is coupled to the delay module 26.

Figure 7B:
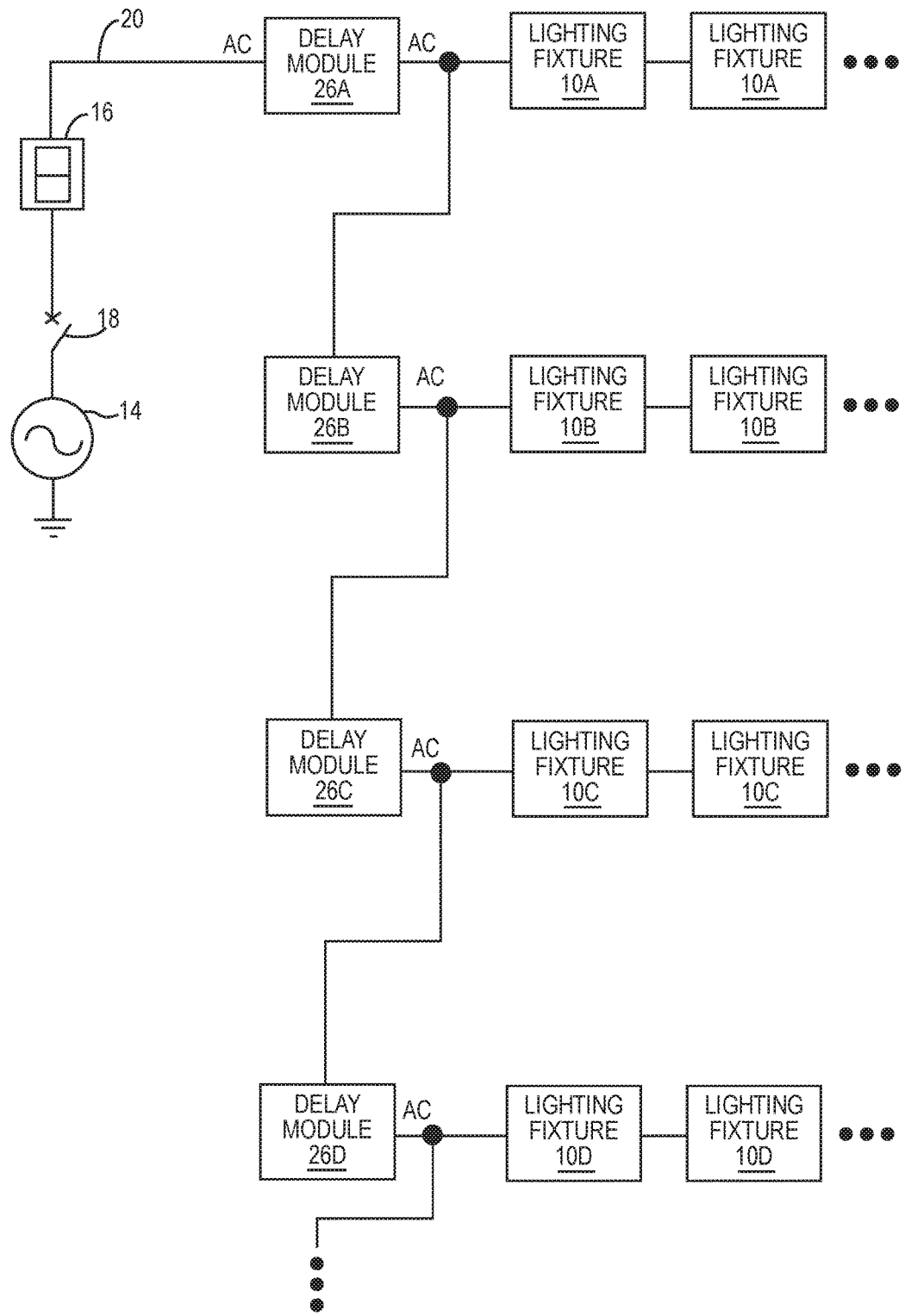
FIG. 7B illustrates a lighting network wherein groups of lighting fixtures are respectively associated with external delay modules, which are daisy-chained together, according to yet another embodiment of the disclosure.

In another embodiment, the delay modules 26 may be daisy-chained together, as illustrated in FIG. 7B. Delay module 26A receives the AC signal from the wall controller 16, and after a first delay period, presents the AC signal to the lighting fixtures 10A and delay module 26B. Delay module 26B receives the AC signal from the delay module 26A, and after a second delay period, presents the AC signal to lighting fixtures 10B and delay module 26C. Delay module 26C receives the AC signal from the delay module 26B, and after a third delay period, presents the AC signal to lighting fixtures 10C and delay module 26D, which presents the AC signal to the lighting fixtures 10D after a fourth delay period, and so on and so forth. The first, second, third, and fourth delay periods may have the same or different delay times. With a daisy-chained configuration, delay modules 26 with the same delay periods can be used to turn on different lighting fixtures 10, or groups thereof, in multiple phases, even if the actual delay period provided by each delay module 26 has the same duration.

Figure 8:
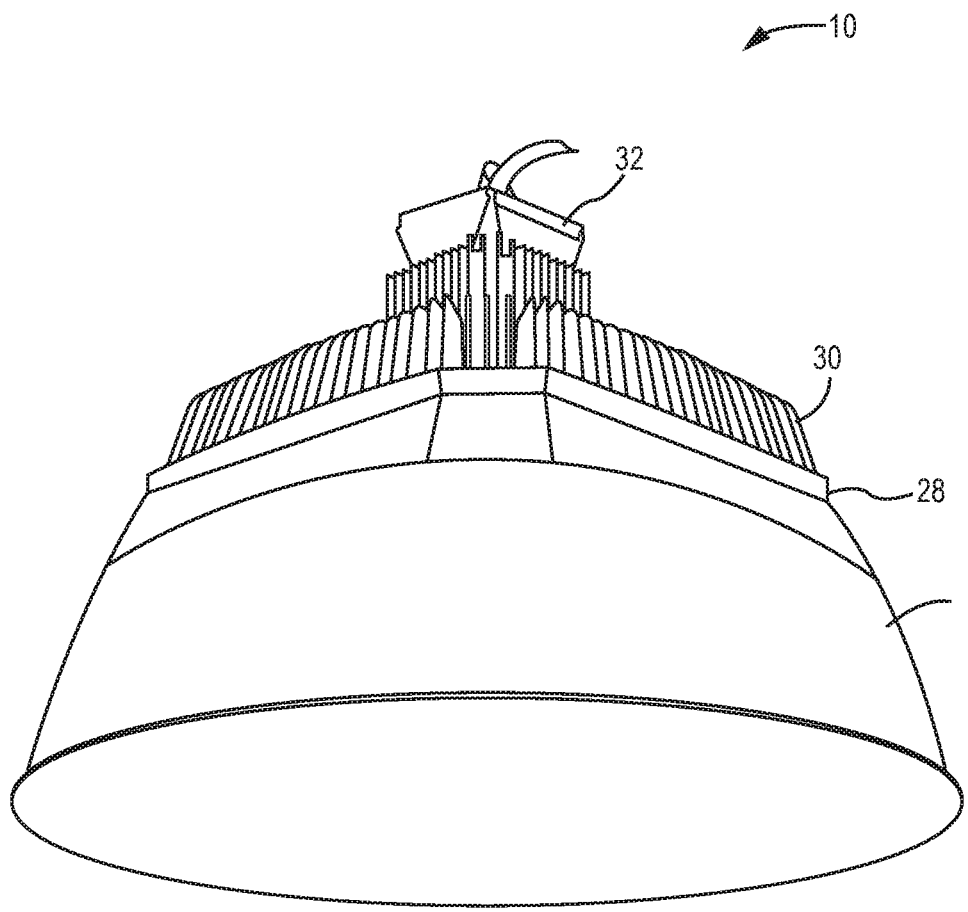
FIGS. 8 and 9 illustrate a lighting fixture according to a first embodiment.
Figure 9:
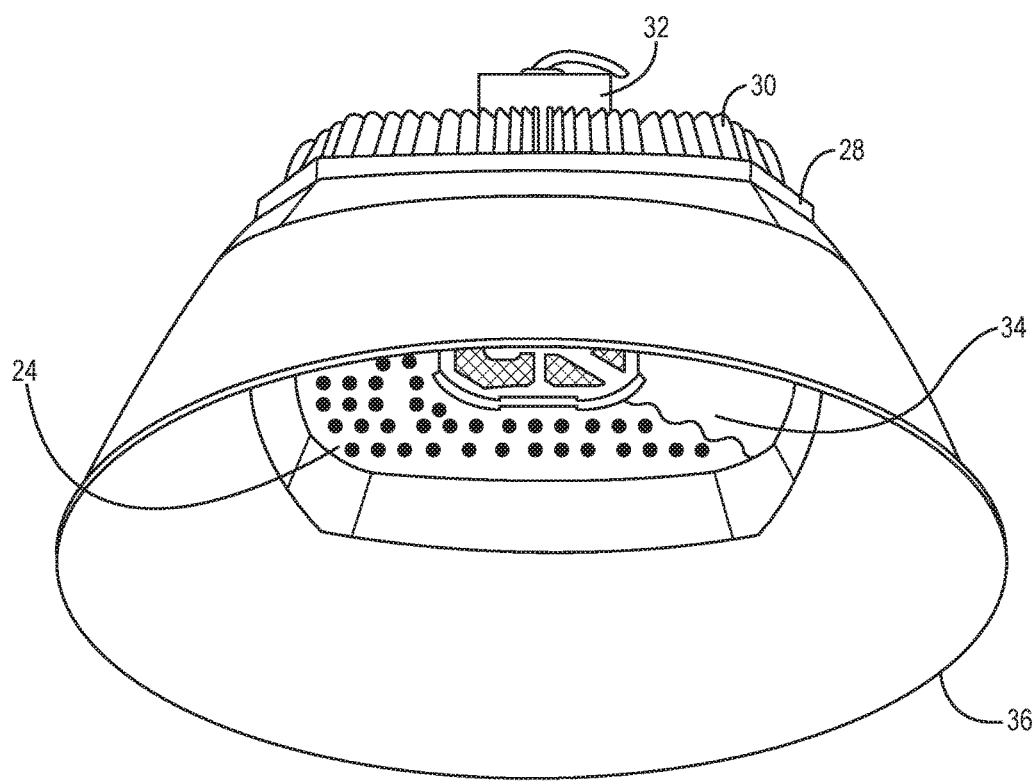

Turning now to FIGS. 8 and 9, an exemplary lighting fixture 10 is illustrated. The illustrated lighting fixture 10 is modeled after an HXB series high bay/low bay lighting fixture that is manufactured by Cree, Inc. of Durham, N.C. The concepts described herein are applicable to any type of lighting fixture and for any type of lighting environment. The lighting fixture 10 includes a frame 28 over which a heatsink 30 and an electronics housing 32 are mounted. The driver module 22 and delay module 26, if integrated within the lighting fixture 10, may be mounted in or on the electronic housing 32. The LED array 24 is mounted on a bottom side of the frame 28 and may be covered by a lens 34. As illustrated, a portion of the lens 34 is shown as being removed to expose the LED array 24. A reflector 36 may be provided about the LED array 24 to aid in directing and mixing light emitted from the LED array 24 for general illumination.

Figure 10:
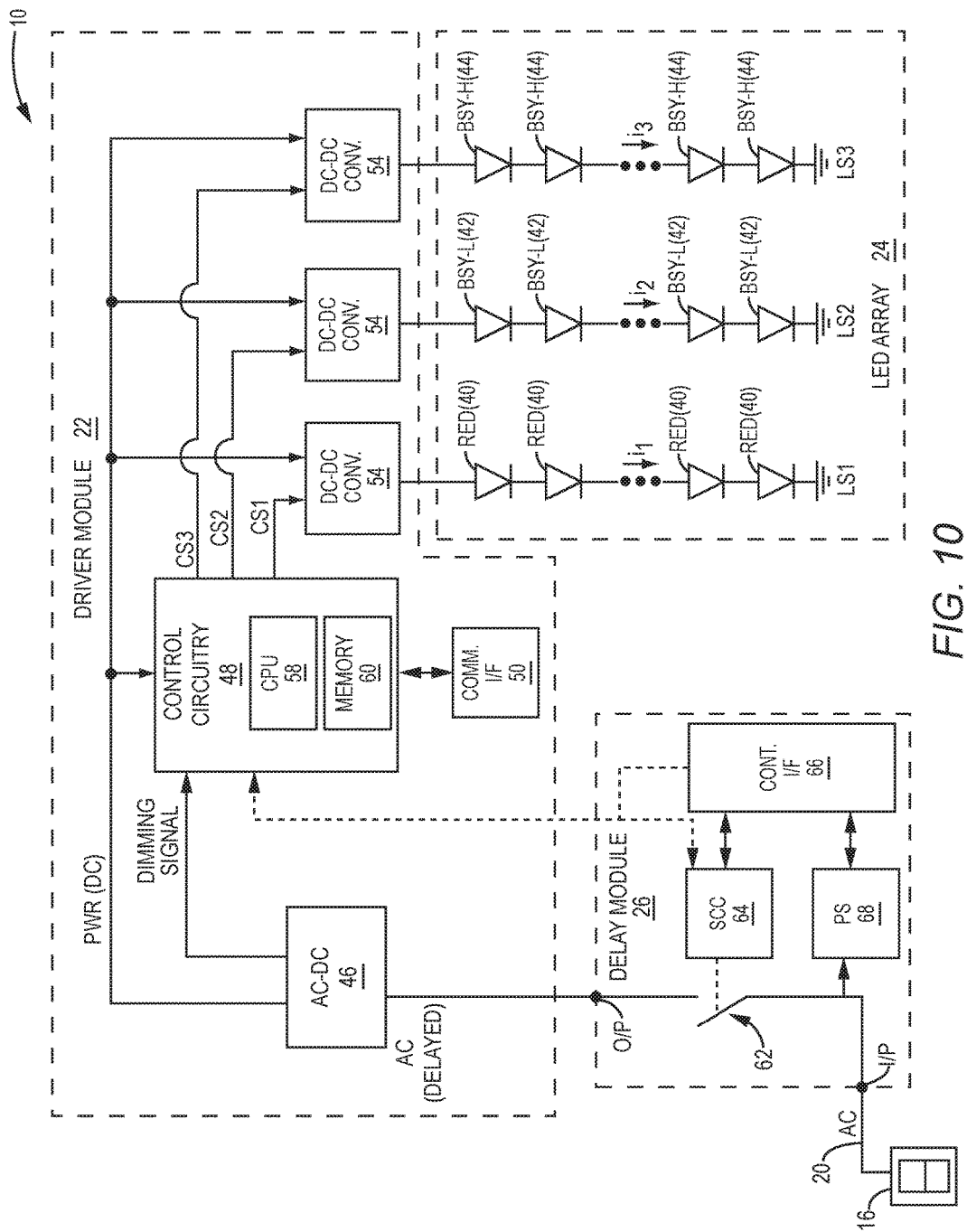
FIG. 10 is a schematic of a lighting fixture associated with a delay module according to one embodiment.

FIG. 10 illustrates an exemplary lighting fixture 10, which includes a driver module 22 and an LED array 24. A delay module 26 is also illustrated that may be integrated with the lighting fixture 10 or provided as a separate, standalone device, as described above. In the illustrated embodiment, the LED array 24 includes a mixture of LEDs of different colors. While those skilled in the art will recognize various color combinations, the following example employs red LEDs 40 that emit reddish light at a first wavelength, blue shifted yellow (BSY) LEDs 42 that emit yellowish/greenish light at a second wavelength, and BSY LEDs 44 that emit yellowish/greenish light at a third wavelength, which is different than the second wavelength. The LED array 24 may be divided into multiple strings of series-connected LEDs. In essence, LED string LS1, which includes a number of red LEDs 40, forms a first group of LEDs. LED string LS2, which includes BSY LEDs 42, forms a second group of LEDs. LED string LS3, which includes BSY LEDs 44, forms a third group of LEDs.

The driver module 22 controls the drive currents $i_1$, $i_2$, and $i_3$, which are used to drive the respective LED strings LS1, LS2, and LS3. The ratio of drive currents $i_1$, $i_2$, and $i_3$ that are provided through respective LED strings LS1, LS2, and LS3 may be adjusted to effectively control the relative intensities of the reddish light emitted from the red LEDs 40 of LED string LS1, the yellowish/greenish light emitted from the BSY LEDs 42 of LED string LS2, and the yellowish/greenish light emitted from the BSY LEDs 44 of LED string LS3. The resultant light from each LED string LS1, LS2, and LS3 mixes to generate an overall light output that has a desired color, correlated color temperature (CCT), and intensity, the latter of which may also be referred to a dimming level. As noted, the overall light output may be white light that falls on or within a desired proximity of the Black Body Locus (BBL) and has a desired CCT.

The number of LED strings LSx may vary from one to many and different combinations of LED colors may be used in the different strings. Each LED string LSx may have LEDs of the same color, variations of the same color, or substantially different colors. In the illustrated embodiment, each LED string LS1, LS2, and LS3 is configured such that all of the LEDs 40, 42, 44 that are in the string are all essentially identical in color. However, the LEDs 40, 42, 44 in each string may vary substantially in color or be completely different colors in certain embodiments. In another embodiment, three LED strings LSx with red, green, and blue LEDs may be used, wherein each LED string LSx is dedicated to a single color. In yet another embodiment, at least two LED strings LSx may be used, wherein the same or different colored BSY or blue shifted green (BSG) LEDs are used in one of the LED strings LSx and red LEDs are used in the other of the LED strings LSx. A single string embodiment is also envisioned, where currents may be individually adjusted for the LEDs of the different colors using bypass circuits or the like.

The driver module 22 includes AC-DC conversion circuitry 46, control circuitry 48, a communication interface (I/F) 50, and a number of current sources, such as the illustrated DC-DC converters 54. The AC-DC conversion circuitry 46 is configured to receive an AC signal (AC), rectify the AC signal, correct the power factor of the AC signal, and provide a DC power signal (PWR). The DC power signal may be used to directly or indirectly power the control circuitry 48 and any other circuitry provided in the driver module 22, including the DC-DC converters 54 and the communication interface 50.

The three respective DC-DC converters 54 of the driver module 22 provide drive currents $i_1$, $i_2$, and $i_3$ for the three LED strings LS1, LS2, and LS3 in response to control signals CS1, CS2, and CS3. The drive currents $i_1$, $i_2$, and $i_3$ may be pulse width modulated (PWM) signals or variable DC signals. If the drive currents $i_1$, $i_2$, and $i_3$ are PWM signals, the control signals CS1, CS2, and CS3 may be PWM signals that effectively turn the respective DC-DC converters 54 on during a logic high state and off during a logic low state of each period of the PWM signal. As a result, the drive currents $i_1$, $i_2$, and $i_3$ for the three LED strings LS1, LS2, and LS3 may also be PWM signals. The intensity of light emitted from each of the three LED strings LS1, LS2, and LS3 will vary based on the duty cycle of the respective PWM signals. The control circuitry 48 will adjust the duty cycle of the drive currents $i_1$, $i_2$, and $i_3$ provided to each of the LED strings LS1, LS2, and LS3 to effectively adjust the intensity of the resultant light emitted from the LED strings LS1, LS2, and LS3 while maintaining the desired CCT based on instructions from the control circuitry 48. If the drive currents $i_1$, $i_2$, and $i_3$ for the three LED strings LS1, LS2, and LS3 are variable DC currents, the control circuitry 48 generates control signals CS1, CS2, and CS3 that result in the DC-DC converters 54 outputting the drive currents $i_1$, $i_2$, and $i_3$ at the appropriate DC levels.

In certain instances, a dimming device, such as a wall controller 16, may control the AC power signal, provide a separate a 0-10 volt DC signal, or the like to the driver module 22. The AC-DC conversion circuitry 46 or other electronics may be configured to detect the relative amount of dimming associated with the AC power signal or 0-10 volt DC signal and provide a corresponding dimming signal (DIMMING SIGNAL) to the control circuitry 48 of the driver module 22.

The control circuitry 48 may include a central processing unit (CPU) 58 and sufficient memory 60 to store the requisite data and software instructions to enable the control circuitry 48 to function as described herein. The control circuitry 48 may interact with the communication interface 50 to facilitate wired or wireless communications with other lighting fixtures 10 or remote devices, as described further below. In certain embodiments, the control circuitry 48 is able to communicate directly or indirectly via the communication interface 50 with the delay module 26.

Notably, when the term "control system" is used in the claims or generically in the specification, the term should be construed broadly to include the hardware and any additional software or firmware that is needed to provide the stated functionality. The term "control system" should not be construed as only software, as electronics are needed to implement control systems described herein. For example, a control system may, but does not necessarily, include the control circuitry 48, the DC-DC converters 54, the AC-DC conversion circuitry 46, and the like.

The delay module 26 includes an input node I/P and an output node O/P. The input node I/P is coupled to the electrical circuit 20, and the output node O/P is coupled to the driver module 22. In one embodiment, the delay module 26 will provide an open circuit between the input node I/P and the output node O/P prior to an AC signal being presented on the electrical circuit 20, such as when the wall controller 16 is in an off state. When an AC signal is initially presented to the electrical circuit 20, such as when the wall controller 16 is switched to an on state, the delay module 26 will provide, or maintain, an open circuit between the input node I/P the output node O/P for a predetermined delay period. Thus, during the delay period, the delay module 26 prevents the AC signal that is on the electrical circuit 20 from passing from the electrical circuit 20 to the driver module 22 of the associated lighting fixture(s) 10. When the delay period expires, the delay module 26 will provide a closed circuit between the input node I/P and the output node O/P, wherein the AC signal is passed from the electrical circuit 20 to the driver module 22 of the associated lighting fixture(s) 10. In certain embodiments, when the AC signal is no longer provided to the input node I/P, such as when the wall controller 16 is returned to an off state, the delay module 26 will again provide an open circuit between the input node I/P and the output node O/P.

In the illustrated embodiment, the delay module 26 includes a switch device 62, switch control circuitry (SCC) 64, and a control interface 66. Certain embodiments of the delay module 26 may include a power supply (PS) 68. The switch device 62 resides between the input node I/P and the output node O/P. Under control of the switch control circuitry 64, the switch device 62 will selectively couple the input node I/P to the output node O/P, and thus, selectively couple the electrical circuit 20 to the driver module 22. The switch device 62 may range from a solid-state, transistor-based switch to a mechanical relay that, when closed, passes the AC signal from the input node I/P to the output node O/P, and when open, isolates the input node I/P from the output node O/P. The switch control circuitry 64 may range from all or part of an inductor-capacitor (LC) circuit to a timer circuit, to an application-specific integrated circuit (ASIC), microcontroller, or microprocessor circuit.

In the illustrated embodiment, the control interface 66 provides either a manual user interface or some form of communication interface through which delay information is received and made accessible to the switch control circuitry 64. The delay information identifies or corresponds to the desired delay period between when the AC signal is initially presented to the delay module 26 and when the switch control circuitry 64 closes the switch device 62 to effectively pass the AC signal from the input node I/P to the output node O/P. Thus, prior to closing the switch device 62, the AC signal is blocked from the AC-DC conversion circuitry 46 of the driver module 22, and as such, the delay module 26 prevents the driver module 22 from being energized, even though an AC signal is presented on the electrical circuit 20. When the switch device 62 is closed, the AC signal is passed to the AC-DC conversion circuitry 46 of the driver module 22, wherein the driver module 22 is energized. The switch device 62 will remain closed until the AC signal is removed from the electrical circuit 20, such as by closing the wall controller 16, or an appropriate input or instruction is provided to the switch control circuitry 64 via the control interface 66. The driver module 22 will remain energized as long as the AC signal is present on the electrical circuit 20 and the switch device 62 is closed.

In the illustrated embodiment, the power supply 68 is directly coupled to the electrical circuit 20 via the input node I/P and converts the AC signal, when present, to one or more DC signals to power the switch control circuitry 64, control interface 66, and/or switch device 62 in a direct or indirect fashion. When the AC signal is removed from the electrical circuit 20, electronics of the delay module 26 will power down. The start of the delay period generally coincides with the AC signal being presented to the input node I/P and the electronics of the delay module 26 receiving power by the AC signal. As such, the switch control circuitry 64 begins the delay period upon becoming operational after the AC signal is received by the delay module 26 and causes the switch device 62 to close, and thus, pass the AC signal to the associated driver module(s) 22 upon expiration of the delay period.

Figure 11:
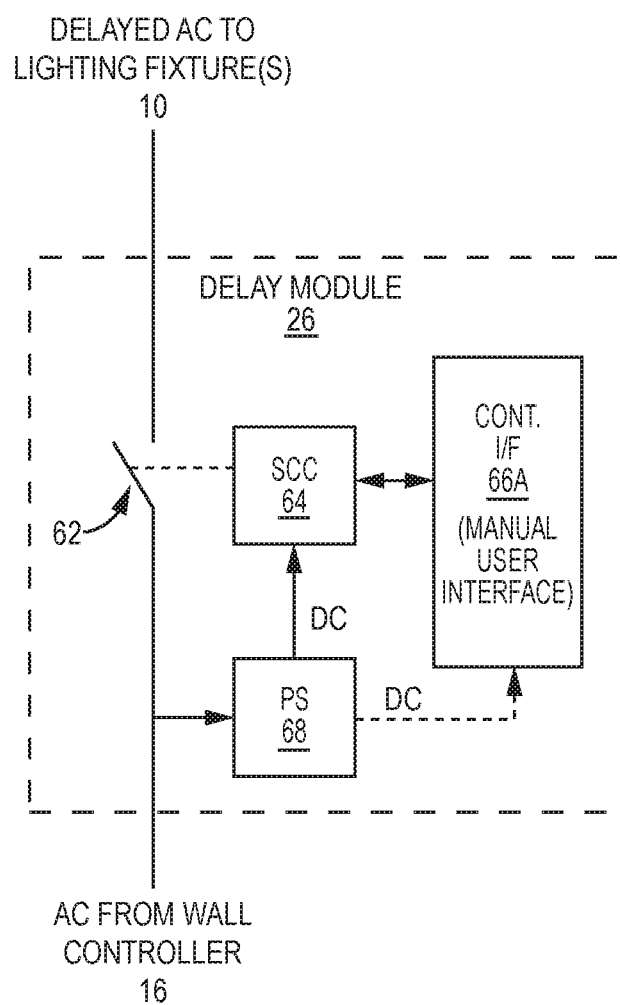
FIG. 11 is a schematic of a delay module according to a first embodiment.
Figure 12:
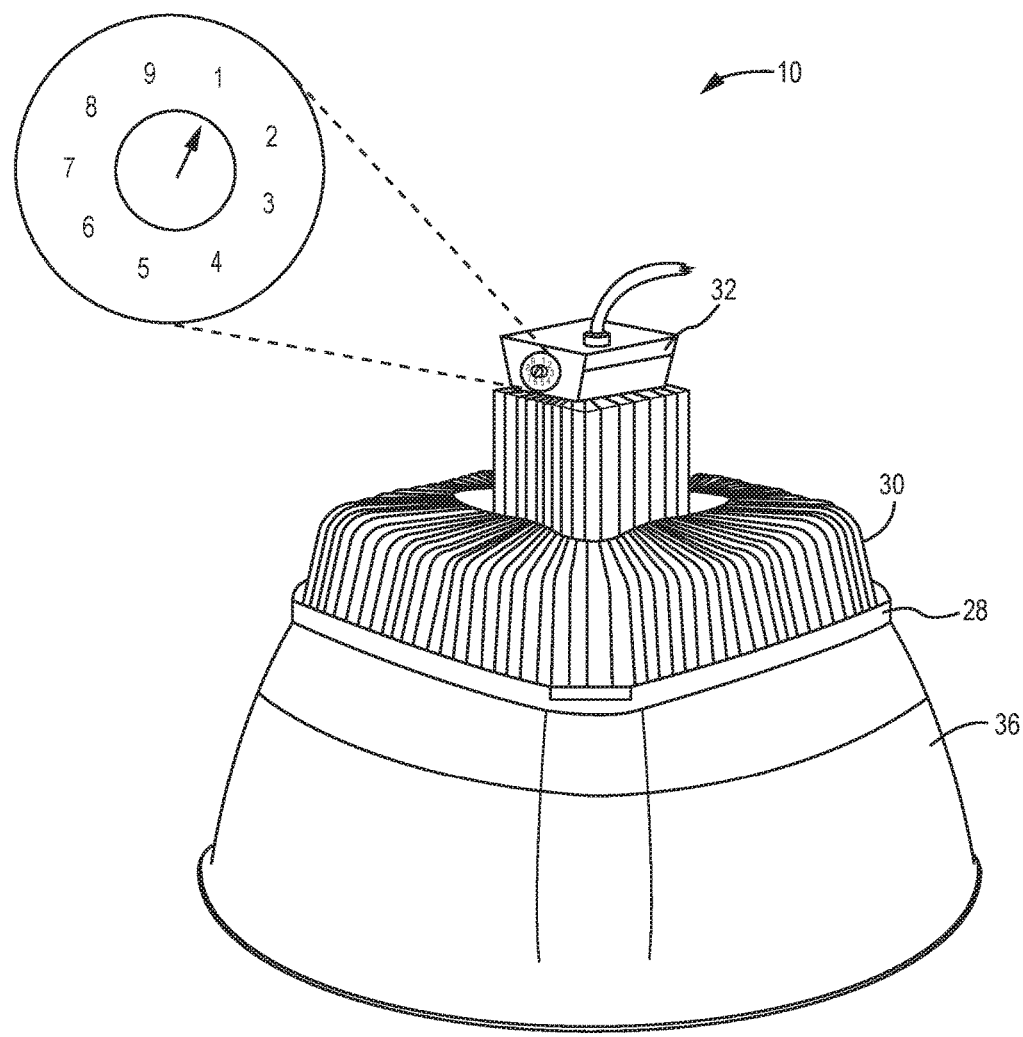
FIG. 12 illustrates a lighting fixture having a delay module with a manual user interface.

FIGS. 11 and 12 illustrate a first embodiment of the delay module 26, wherein the control interface 66 is provided by a manual user interface 66A. The manual user interface 66A, as illustrated in FIG. 12, is a rotary dial having a set number of positions, wherein each position corresponds to a delay period of a different length. In this example, the rotary dial has nine positions, positions 1-9, wherein position number 1 corresponds to a delay period of 10 ms, position number 2 corresponds to a delay period of 20 ms, position number 3 corresponds to a delay period of 30 ms, position number 4 corresponds to a delay period of 40 ms, etc. The switch control circuitry 64 is configured to determine the position of the rotary dial and set the delay period based on the position of the rotary dial of the manual user interface 66A.

The manual user interface 66A may take any form through which the user can provide input indicative of a desired delay period for the associated lighting fixture(s) 10. For example, the manual user interface 66A may include, but is not limited to, one or any combination of dip switches, potentiometers, keypads, touchscreens, and the like.

Figure 13:
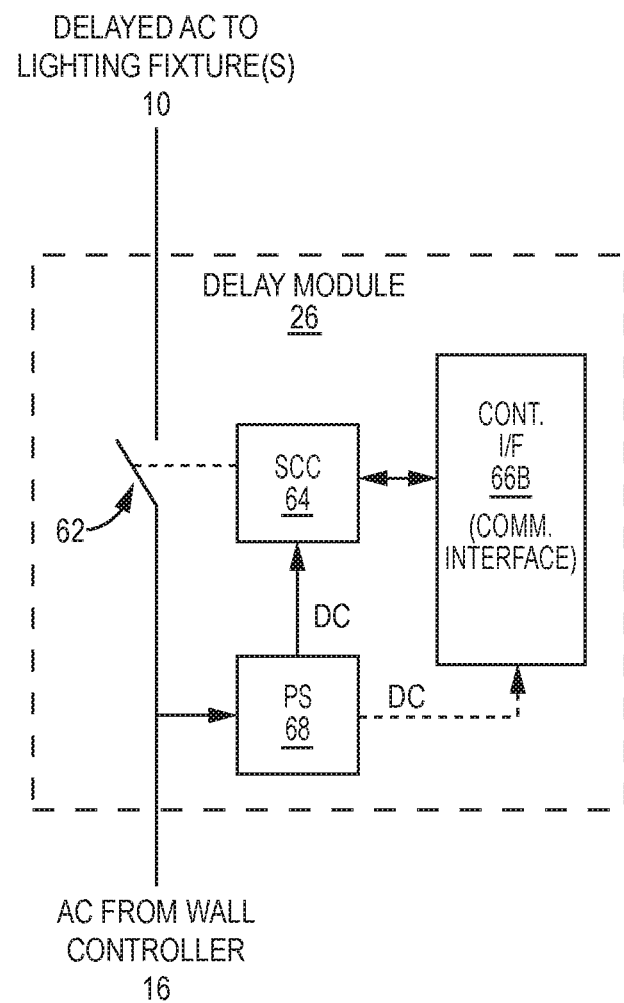
FIG. 13 is a schematic of a delay module according to a second embodiment.
Figure 14:
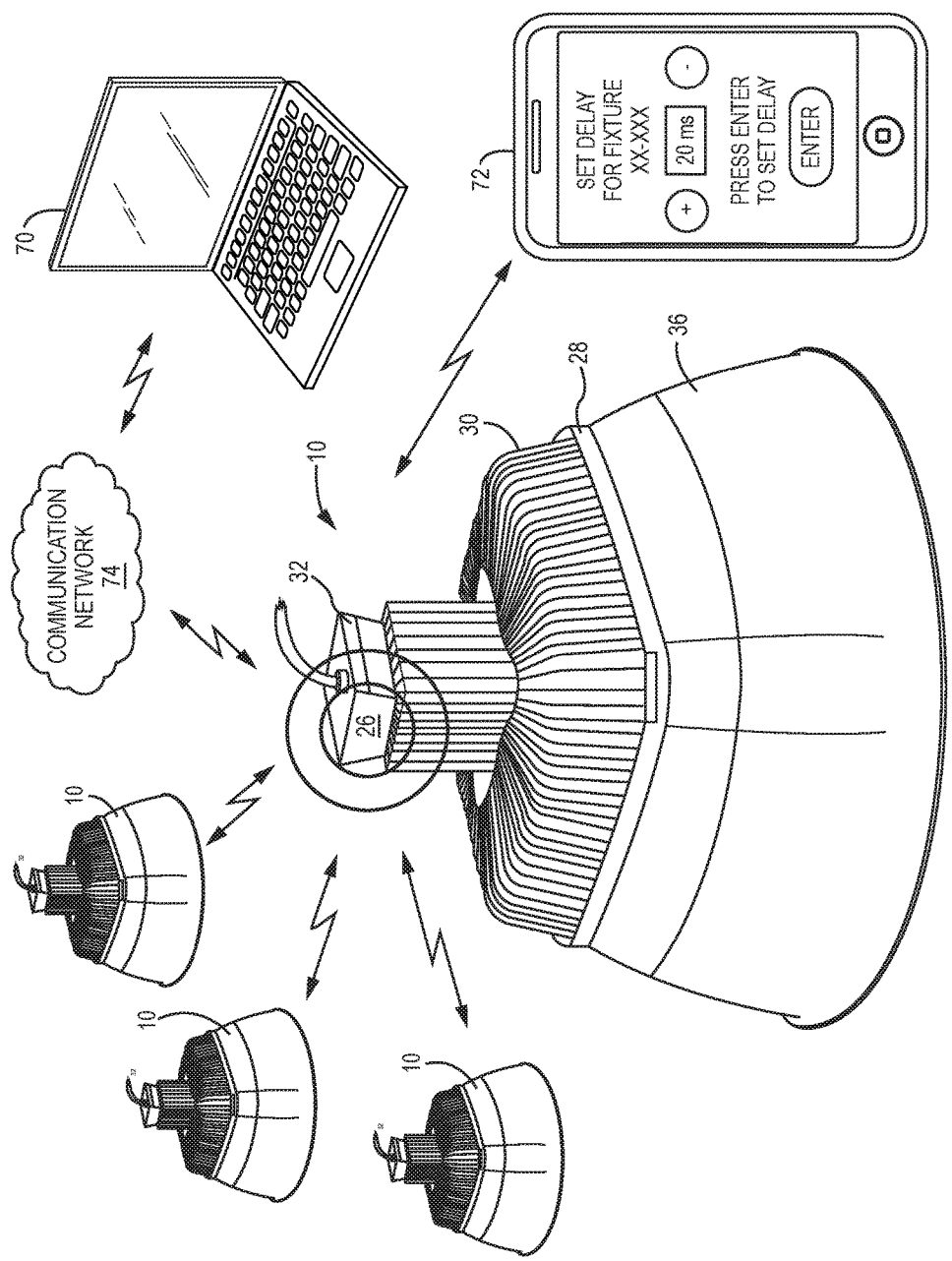
FIG. 14 illustrates a lighting fixture having a delay module with wireless communication capabilities.

FIGS. 13 and 14 illustrate a second embodiment of the delay module 26, wherein the control interface 66 is provided by a wireless communication interface 66B. When equipped with a wireless communication interface 66B, the delay module 26 is capable of wirelessly communicating with any number of entities, such as other lighting fixtures 10, computing devices 70, and/or mobile devices 72, directly or indirectly via a communication network 74. Accordingly, virtually any type of remote device may provide delay information to the delay module 26 via the wireless communication interface 66B. The delay information, which bears on the desired length of the delay period, is passed to the switch control circuitry 64, which will set the delay period based on the delay information.

Figure 15:
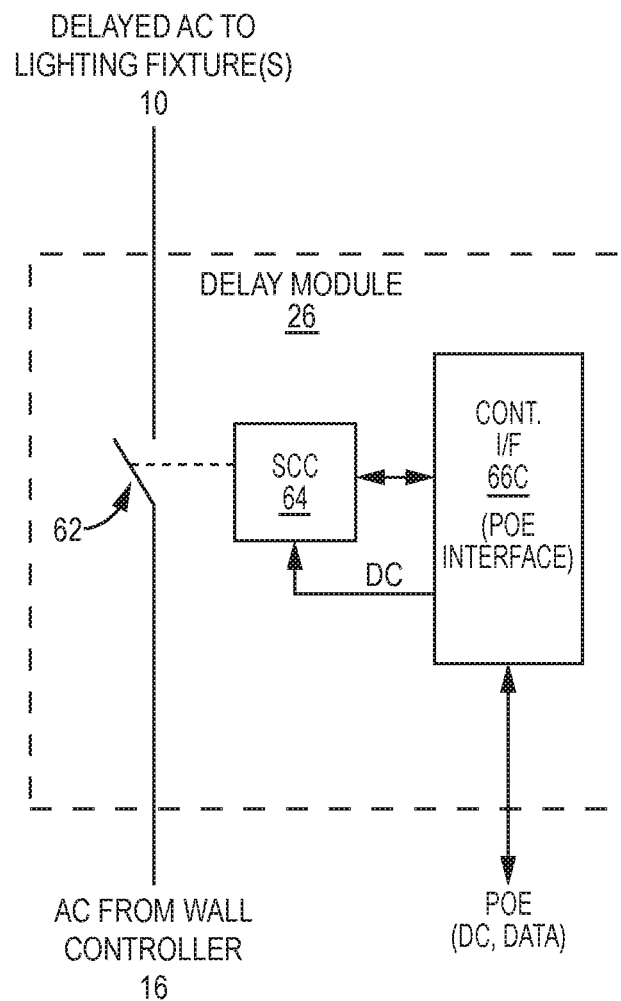
FIG. 15 is a schematic of a delay module according to a third embodiment.
Figure 16:
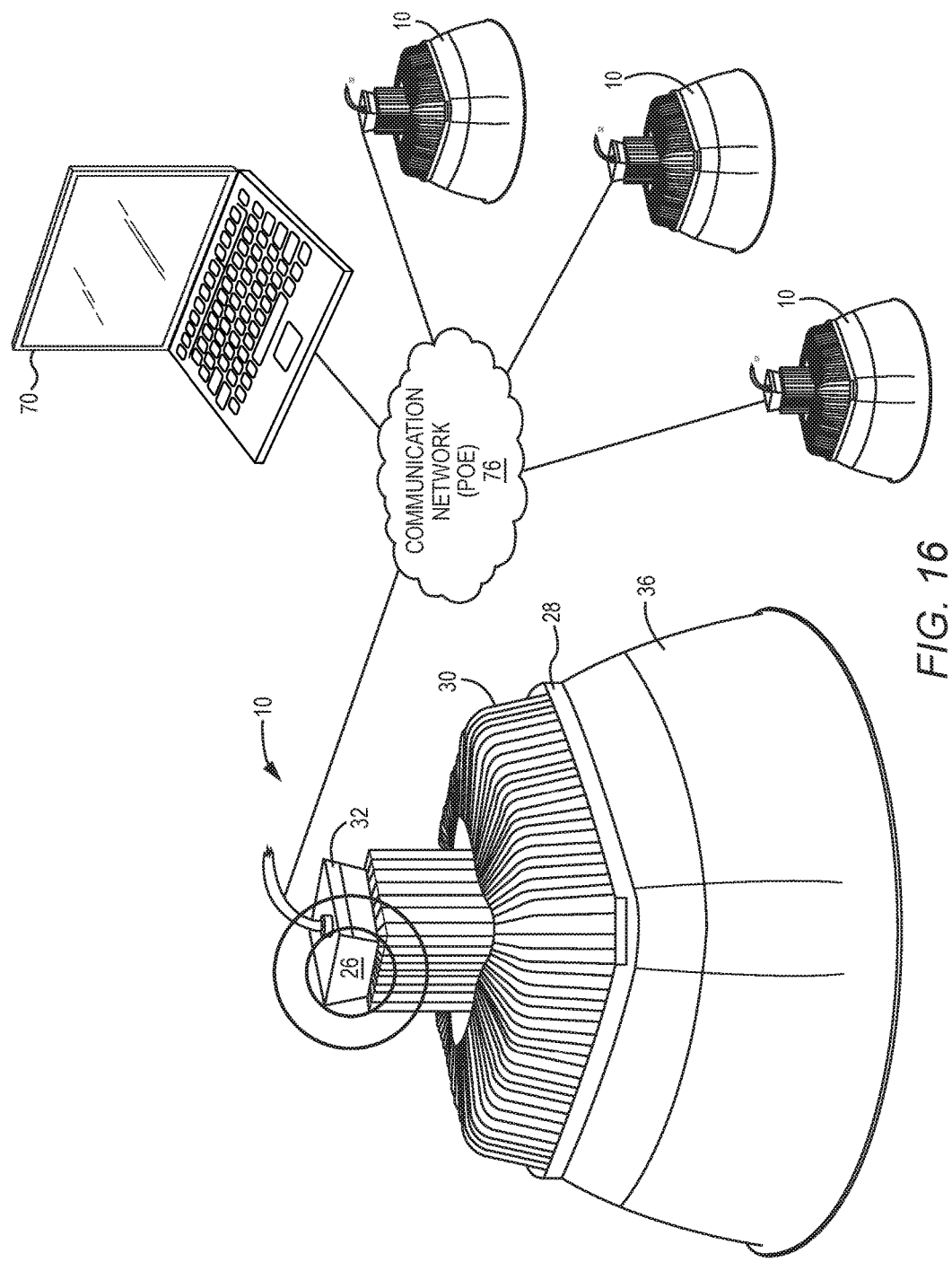
FIG. 16 illustrates a lighting fixture having a delay module with wired communication capabilities.

FIGS. 15 and 16 illustrate a third embodiment of the delay module 26, wherein the control interface 66 is provided by a wired communication interface 66C. When equipped with a wired communication interface 66C, the delay module 26 is capable of communicating with any number of entities, such as other lighting fixtures 10, computing devices 70, and/or mobile devices 72, directly or indirectly via a communication network 76, which may be an Ethernet-based communication network. As illustrated, the wired communication interface 66C is a Power over Ethernet (PoE) interface, wherein power may be provided to the various devices connected to the communication network 76 over the same cabling that supports the data transfer necessary for communications. With reference to FIG. 15, power is provided to the delay module 26, and in particular to the switch control circuitry 64, and if necessary for operation the switch device 62, via the wired communication interface 66C. As such, there is no need for a separate power supply 68, as described in the above embodiments.

As those skilled in the art will appreciate, the delay information can be provided to delay modules 26, which may be separate from or integrated into the lighting fixtures 10, in a variety of ways. The delay information for each delay module 26 may be the same or different, random or scheduled. The delay information may be set manually or provided by remote devices, which can range from handheld devices to centralized control systems. Further, the lighting fixtures 10 may actually determine and share the delay information in a distributed or centralized manner. The delay modules 26 and/or lighting fixtures 10 may be configured to determine their actual or relative locations, determine delay information for the respective delay modules 26, and provide or share the delay information to the respective delay modules 26 such that a desired lighting effect can be achieved upon exciting the electrical circuit 20 with the AC signal.

When the delay module 26 receives power from a source other than the electrical circuit 20, the switch control circuitry 64 may be active when the electrical circuit 20 is not energized. In such embodiments, the delay module 26 may receive delay information or other instructions from as well as send information to other lighting fixtures 10, computing devices 70, the wall controller 16, and/or mobile devices 72. The delay module 26 may monitor for the presence or absence of the electrical circuit 20 for the AC signal through an appropriate sensor and report such information to these remote entities, which may dynamically respond with delay information that includes or from which the delay period may be derived. As such, the delay module 26 may receive and/or determine the delay period dynamically after the electrical circuit 20 is energized, or as described above, store the delay period, wherein the delay period is known to the delay module 26 before the electrical circuit 20 is energized during normal operation.

Virtually any type of remote device may provide delay information bearing on the desired length of the delay period to the delay module 26 via the wired communication interface 66C. The delay information is passed to the switch control circuitry 64, which will set the delay period based on the delay information. The delay information may also be provided by or via the driver module 22 of an associated lighting fixture 10. Returning to FIG. 10, the delay information may also be communicated in a wired or wireless fashion from other lighting fixtures 10, computing devices 70, and/or mobile devices 72 to the control circuitry 48 of a lighting fixture 10 via the communication interface 50, which is part of or otherwise associated with the driver module 22. The delay information received by the control circuitry 48 may be provided to the switch control circuitry 64 of the delay module 26 directly or via the control interface 66, depending on the configuration of the delay module 26.

Regardless of how or from where the delay information is received, once the delay information is received by the delay module 26 and the delay period is determined, the switch control circuitry 64 of the delay module 26 will control the switch device 62 such that presentation of the AC signal to the associated driver module(s) 22 is delayed from presentation of the AC signal to the delay module 26 by the delay period. For a given electrical circuit 20, such as that illustrated in FIG. 3, 4, or 5, the delay modules 26 for different lighting fixtures 10 or groups of lighting fixtures 10 may be configured with different delay periods. As such, when the wall controller 16 transitions from an off state to an on state and the AC signal is presented to the delay modules 26, the different delay modules 26 function to pass the AC signal to the different associated lighting fixtures 10 or groups of lighting fixtures 10 at different times according to the respective delay periods. As indicated above, the delay periods for the various delay modules 26 may be set based on the physical or relative location of the lighting fixtures 10, such that various lighting effects, such as the wave effects described above, occur in response to presenting the electrical circuit 20 with the AC signal. Accordingly, the delay periods will typically vary from one delay module 26 to another or between individual lighting fixtures 10 or groups of lighting fixtures 10 on a particular electrical circuit 20, such that the inrush currents for each lighting fixture 10 or subgroups of lighting fixtures 10 on the electrical circuit 20 occur at different times.

Figure 17:
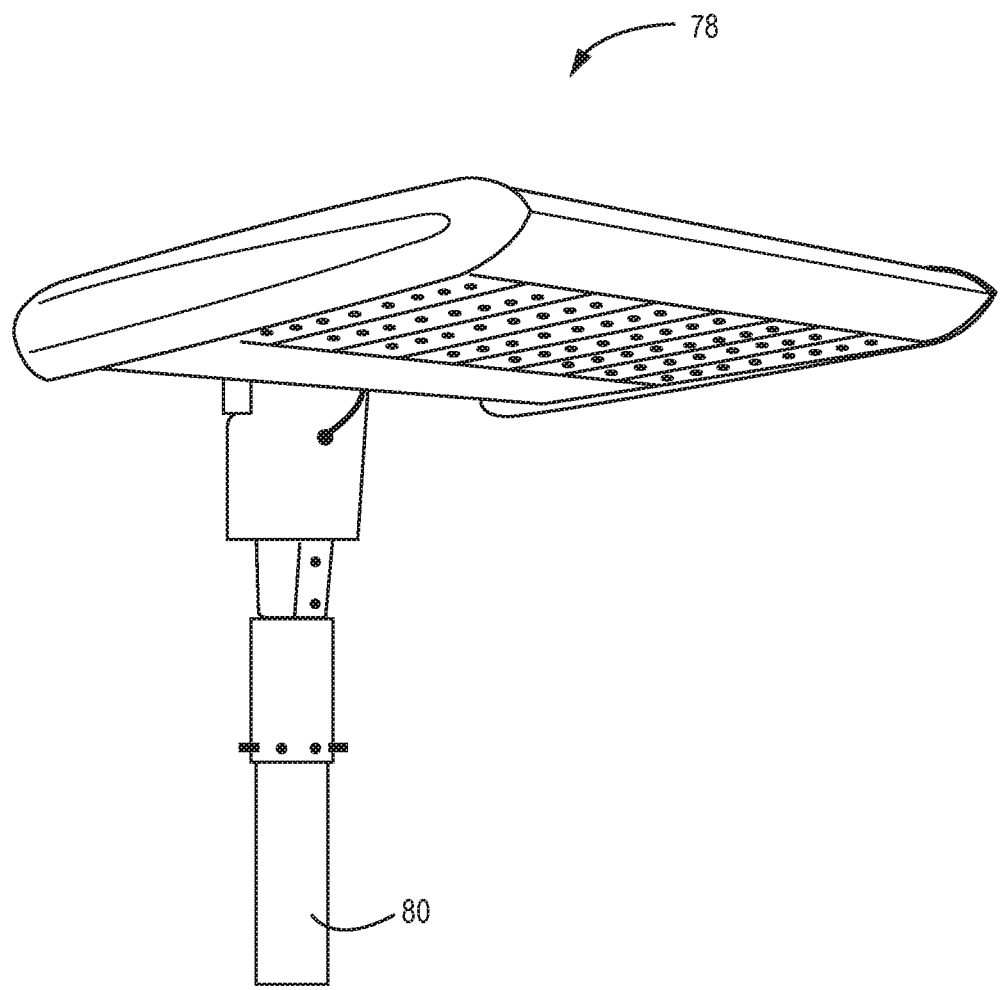
FIGS. 17 and 18 illustrate lighting fixtures according to a second embodiment.
Figure 18:
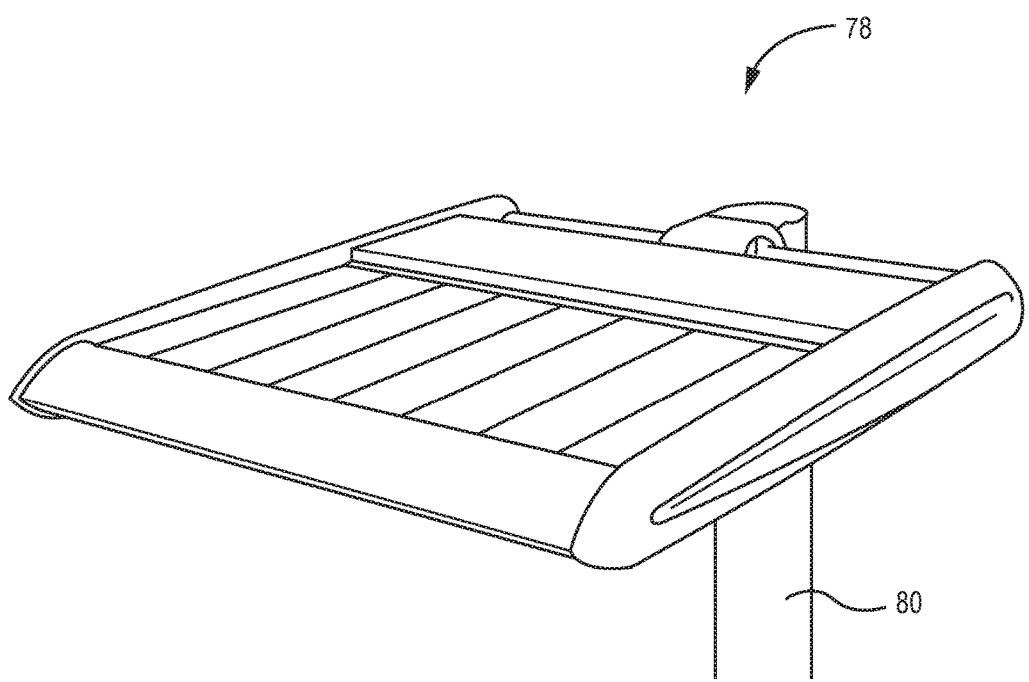

As noted above, the concepts described herein are applicable to virtually any type of lighting fixture or lighting environment. While the embodiments described above use lighting fixtures 10 configured for high bay and/or low bay applications, other embodiments may include outdoor lighting fixtures 78, which are mounted to poles 80, tenons, or the like, such as those illustrated in FIGS. 17 and 18. Regardless of the particular lighting environment, incorporation of delay modules 26 as described herein allows designers to distribute inrush currents for the various lighting fixtures 10 on a particular electrical circuit 20 over time to avoid the excessive combination of inrush currents at any given time. As a result, excessive inrush currents are avoided and more lighting fixtures 10 may be served by a particular electrical circuit 20.

Those skilled in the art will recognize improvements and modifications to the preferred embodiments of the present disclosure. All such improvements and modifications are considered within the scope of the concepts disclosed herein and the claims that follow.

What is claimed is:

1. A lighting fixture comprising:
    an LED array configured to emit light for general illumination in response to a drive signal;
    a driver module configured to receive an AC signal and provide the drive signal to the LED array; and
    a delay module configured to:
        provide an open circuit between an input node and an output node for a delay period that starts when the AC signal is initially presented to the input node, such that the AC signal is not passed from the input node to the output node during the delay period, wherein the input node is configured to be coupled to an electrical circuit over which the AC signal is selectively provided, and the output node is coupled to the driver module; and
        provide a closed circuit between the input node and the output node at an end of the delay period, such that the AC signal is passed from the input node to the output node.

2. The lighting fixture of claim 1 wherein the delay module is further configured to provide the open circuit between the input node and the output node prior to the AC signal being presented to the input node.

3. The lighting fixture of claim 2 wherein the delay module is further configured to provide the open circuit between the input node and the output node after the AC signal is no longer presented to the input node.

4. The lighting fixture of claim 1 wherein the delay module is further configured to provide the open circuit between the input node and the output node after the AC signal is no longer presented to the input node.

5. The lighting fixture of claim 1 wherein the delay module is configured to receive user input that corresponds to the delay period via a user interface.

6. The lighting fixture of claim 1 wherein the delay module is configured to receive delay information that corresponds to the delay period via a wireless communication interface.

7. The lighting fixture of claim 1 wherein the delay module is configured to receive delay information that corresponds to the delay period via a wired communication interface.

8. The lighting fixture of claim 1 wherein the delay module is configured to receive delay information that corresponds to the delay period from the driver module.

9. The lighting fixture of claim 1 wherein the delay module receives power via the AC signal.

10. The lighting fixture of claim 1 wherein the delay module receives power via a source other than the AC signal.

11. The lighting fixture of claim 1 wherein the delay module comprises:
    a switch device coupled between the input node and the output node; and
    switch control circuitry configured to cause the switch device to:
        provide the open circuit between the input node and the output node for the delay period that starts when the AC signal is initially presented to the input node, such that the AC signal is not passed from the input node to the output node during the delay period; and
        provide the closed circuit between the input node and the output node at the end of the delay period such that the AC signal is passed from the input node to the output node.

12. The lighting fixture of claim 11 wherein the switch control circuitry is further configured to cause the switch device to provide the open circuit between the input node and the output node prior to the AC signal being presented to the input node.

13. The lighting fixture of claim 12 wherein the switch control circuitry is further configured to cause the switch device to provide the open circuit between the input node and the output node after the AC signal is no longer presented to the input node.

14. The lighting fixture of claim 11 wherein the switch control circuitry is further configured to cause the switch device to provide the open circuit between the input node and the output node after the AC signal is no longer presented to the input node.

15. The lighting fixture of claim 11 further comprising a manual user interface associated with the switch control circuitry, wherein the manual user interface is configured to receive user input that corresponds to the delay period, and the switch control circuitry determines the delay period based on the user input.

16. The lighting fixture of claim 11 further comprising a communication interface associated with the switch control circuitry, wherein the communication interface is configured to receive delay information that corresponds to the delay period, and the switch control circuitry determines the delay period based on the delay information.

17. The lighting fixture of claim 16 wherein the communication interface is a wireless communication interface and the delay information is received via wireless communications.

18. The lighting fixture claim 16 wherein the communication interface is a wired communication interface, and the delay information is received via wired communications.

19. The lighting fixture claim 18 wherein the communication interface is a power over ethernet interface, and power for the switch control circuitry is provided via the power over ethernet interface.

20. The lighting fixture of claim 11 further comprising a power supply coupled to the input node and configured to provide power to the switch control circuitry when the AC signal is presented to the input node.

21. A delay module for at least one lighting fixture comprising:
   a switch device coupled between an input node and an output node, wherein the input node is configured for coupling to an electrical circuit over which an AC signal is selectively provided, and the output node is configured for coupling to a driver module of the at least one lighting fixture; and
   switch control circuitry configured to cause the switch device to:
      provide an open circuit between the input node and the output node for a delay period that starts when the AC signal is initially presented to the input node, such that the AC signal is not passed from the input node to the output node during the delay period; and
      provide a closed circuit between the input node and the output node at an end of the delay period, such that the AC signal is passed from the input node to the output node.

22. The delay module of claim 21 wherein the switch control circuitry is further configured to cause the switch device to provide the open circuit between the input node and the output node prior to the AC signal being presented to the input node.

23. The delay module of claim 22 wherein the switch control circuitry is further configured to cause the switch device to provide the open circuit between the input node and the output node after the AC signal is no longer presented to the input node.

24. The delay module of claim 21 wherein the switch control circuitry is further configured to cause the switch device to provide the open circuit between the input node and the output node after the AC signal is no longer presented to the input node.

25. The delay module of claim 21 further comprising a manual user interface associated with the switch control circuitry, wherein the manual user interface is configured to receive user input that corresponds to the delay period, and the switch control circuitry determines the delay period based on the user input.

26. The delay module of claim 21 further comprising a communication interface associated with the switch control circuitry, wherein the communication interface is configured to receive delay information that corresponds to the delay period, and the switch control circuitry determines the delay period based on the delay information.

27. The delay module of claim 26 wherein the communication interface is a wireless communication interface and the delay information is received via wireless communications.

28. The delay module claim 26 wherein the communication interface is a wired communication interface, and the delay information is received via wired communications.

29. The delay module claim 28 wherein the communication interface is a power over ethernet interface, and power for the switch control circuitry is provided via the power over ethernet interface.

30. The delay module of claim 21 further comprising a power supply coupled to the input node and configured to provide power to the switch control circuitry when the AC signal is presented to the input node.

31. A lighting network comprising a plurality of lighting fixtures and a plurality of delay modules that are coupled to an electrical circuit; wherein:
   each of the plurality of lighting fixtures comprises an LED array configured to emit light for general illumination in response to a drive signal, and a driver module configured to receive an AC signal and provide the drive signal to the LED array; and
   each of the plurality of delay modules is coupled between the electrical circuit and at least one of the plurality of lighting fixtures and configured to:
      provide an open circuit between an input node and an output node for a delay period that starts when the AC signal is initially presented to the input node, such that the AC signal is not passed from the input node to the output node during the delay period, wherein the input node is configured to be coupled to the electrical circuit over which the AC signal is selectively provided, and the output node is coupled to the driver module; and
      provide a closed circuit between the input node and the output node at an end of the delay period such that the AC signal is passed from the input node to the output node.

32. The lighting network of claim 31 wherein at least two of the plurality of lighting fixtures are coupled to the output node of at least one of the plurality of delay modules such that the at least one of the plurality of delay modules controls passage of the AC signal to the at least two of the plurality of lighting fixtures.

33. The lighting network of claim 31 wherein one of the plurality of delay modules is allocated to one of the plurality of lighting fixtures.

34. The lighting network of claim 31 wherein at least one of the plurality of delay modules is integrated within at least one of the plurality of lighting fixtures.

35. The lighting network of claim 31 wherein at least one of the plurality of delay modules is separate from at least one of the plurality of lighting fixtures.

36. The lighting network of claim 31 wherein each of the plurality of delay modules is further configured to provide the open circuit between the input node and the output node prior to the AC signal being presented to the input node.

37. The lighting network of claim 32 wherein each of the plurality of delay modules is further configured to provide the open circuit between the input node and the output node after the AC signal is no longer presented to the input node.

38. The lighting network of claim 31 wherein each of the plurality of delay modules is further configured to provide the open circuit between the input node and the output node after the AC signal is no longer presented to the input node.

39. The lighting network of claim 31 wherein each of the plurality of delay modules is configured to receive user input that corresponds to the delay period via a user interface.

40. The lighting network of claim 31 wherein each of the plurality of delay modules is configured to receive delay information that corresponds to the delay period via a wireless communication interface.

41. The lighting network of claim 31 wherein each of the plurality of delay modules is configured to receive delay information that corresponds to the delay period via a wired communication interface.

42. A lighting network comprising a plurality of lighting fixtures and a plurality of delay modules, wherein:
  each of the plurality of lighting fixtures comprises an LED array configured to emit light for general illumination in response to a drive signal, and a driver module configured to receive an AC signal and provide the drive signal to the LED array; and
  each of the plurality of delay modules is configured to:
    provide an open circuit between an input node and an output node for a delay period that starts when the AC signal is initially presented to the input node, such that the AC signal is not passed from the input node to the output node during the delay period; and
    provide a closed circuit between the input node and the output node at an end of the delay period such that the AC signal is passed from the input node to the output node,
  wherein the plurality of delay modules are connected in series such that the input node of a first delay module of the plurality of delay modules is coupled to an AC circuit, the output node of the first delay module is coupled to the input node of a second delay module of the plurality of delay modules, at least a first lighting fixture of the plurality of lighting fixtures is coupled to the output node of the first delay module, and at least a second lighting fixture of the plurality of lighting fixtures is coupled to the output node of the second delay module.

43. The lighting network of claim 42 wherein at least two of the plurality of lighting fixtures are coupled to the output node of the first delay module.

44. The lighting network of claim 42 wherein the output node of the second delay module is coupled to the input node of a third delay module of the plurality of delay modules, and at least a third lighting fixture of the plurality of lighting fixtures is coupled to the output node of the third delay module.

* * * * *